US008078839B2

(12) United States Patent
Fant (10) Patent No.: US 8,078,839 B2
(45) Date of Patent: Dec. 13, 2011

(54) CONCURRENT PROCESSING ELEMENT SYSTEM, AND METHOD

(75) Inventor: Karl Fant, Mountain View, CA (US)

(73) Assignee: Wave Semiconductor, San Jose, CA (US)

( * ) Notice: Subject to any disclaimer, the term of this patent is extended or adjusted under 35 U.S.C. 154(b) by 353 days.

(21) Appl. No.: 12/314,572

(22) Filed: Dec. 12, 2008

(65) Prior Publication Data

US 2009/0182993 A1      Jul. 16, 2009

Related U.S. Application Data

(60) Provisional application No. 60/996,973, filed on Dec. 13, 2007.

(51) Int. Cl.
*G06F 9/30* (2006.01)
*G06F 9/40* (2006.01)
*G06F 15/00* (2006.01)
*G06F 7/38* (2006.01)

(52) U.S. Cl. .......................... 712/201; 712/10
(58) Field of Classification Search .................. None
See application file for complete search history.

(56) References Cited

U.S. PATENT DOCUMENTS

| 4,720,780 A | * | 1/1988 | Dolecek | 712/18 |
| 5,465,368 A | * | 11/1995 | Davidson et al. | 712/27 |
| 5,930,522 A | * | 7/1999 | Fant | 712/25 |

* cited by examiner

*Primary Examiner* — Corey S Faherty
(74) *Attorney, Agent, or Firm* — Connolly Bove Lodge & Hutz LLP (57) ABSTRACT

An electronic processing element is disclosed for use in a system having a plurality of processing elements. The electronic processing element includes an input instruction memory, an operation unit, and an output instruction memory. The input instruction memory is configured to store and retrieve a plurality of operation codes and, for each operation code, an associated output instruction memory address. The operation unit is configured to generate an output datum defined by at least a selected operation code and an associated input datum. The output instruction memory is configured to receive the output instruction memory address and to retrieve an address for an input instruction memory of a second processing element. Upon selection of an input instruction memory address and presentation of an associated input datum, the processing element generates an output datum in association with a corresponding input instruction memory address of the second processing element.

20 Claims, 9 Drawing Sheets

$$x = \frac{-b \pm \sqrt{b^2 - 4ac}}{2a}$$

CONCURRENT PROCESSING ELEMENT SYSTEM, AND METHOD

CROSS-REFERENCE TO RELATED APPLICATIONS

The instant application claims priority to U.S. Provisional Application 60/996,973 filed on Dec. 13, 2007, which is incorporated by reference herein in its entirety.

STATEMENT REGARDING FEDERALLY SPONSORED RESEARCH OR DEVELOPMENT

None.

NAMES OF THE PARTIES TO A JOINT RESEARCH AGREEMENT

None.

BACKGROUND

The predominant computer architecture historically used a single processor to execute sequentially a stream of program instructions retrieved from a central instruction memory over a communication channel, such as a data bus.

In the relatively recent past, "multi-core" processors have become commercially available for so-called personal computers. While such architectures provide two or more processors, they continue to adhere to a general architecture of retrieving program instructions from a central instruction memory over a data bus.

The problem of a generalized and scalable solution to concurrent processing that takes full advantage of all concurrency inherently available in a process remains unsolved.

SUMMARY

Attempting to implement and exploit concurrent computation behavior within the paradigm of explicitly synchronized sequential behavior is futile. The perceived complexity of concurrency arises from trying to mix centralized, explicitly controlled and temporally coordinated behavior with distributed, spontaneously flowing and logically coordinated behavior. The key to understanding and exploiting general concurrency is to eliminate the former.

To understand and exploit concurrent behavior a different model of process expression and behavior is needed—a model that is distributed and concurrent at its foundations instead of one that is centralized and sequential. Such a model is presented in Karl M. Fant, *Computer Science Reconsidered: The Invocation Model of Process Expression*, (Hoboken, N.J., Wiley Interscience, 2007).

An object of the invention is to provide a computing architecture and programming method that fully exploits all concurrency that is inherently available in a process. Other objects of the invention are:
(i) to provide an improved methodology for expressing concurrent processes;
(ii) to provided an improved processor for concurrent computation;
(iii) to provide an improved methodology for performing concurrent computation; and
(iv) to provide an improved method of loading instructions into a computing architecture.

These and other objects are achieved by providing a computing architecture of homogeneous, interconnected Concurrent Processing Elements (CPE's). A concurrent program is loaded into the architecture by mapping successive operations of the concurrent program into neighboring CPEs such that each successive operation/instruction is in a next CPE. Data arrives at a CPE at any of a plurality of input data ports along with an address location at which is stored an operation to be performed on the data. When a CPE completes an operation/instruction, it forwards the result data to the next CPE along with an address in the next CPE where the next operation to be performed on the data is stored. Wavefronts of data flow spontaneously, autonomously, and statelessly from CPE to CPE along with addresses.

At the CPE level, a preferred program instruction identifies:
(i) an operation to be performed,
(ii) a next CPE for the next operation in the process, and
(iv) a memory address at the next CPE for the next operation in the process.

The CPE performs the operation and generates an output consisting of:
(i) the result data,
(ii) an identification of a next CPE for performing the next operation of the process, and
(iii) an instruction memory address at the next CPE at which is stores the instruction for the next operation. When an operation requires a single datum, the operation may execute immediately upon arrival at the CPE of the datum/address wavefront. Where an operation requires two datums from differing CPE's, two wavefronts will reference the same instruction memory address. The operation of the instruction memory address will be performed upon arrival at the CPE of two wavefronts referring to the same instruction address.

A preferred CPE internally has an address arbitration funnel, an input instruction memory, an operation unit, and an output instruction memory. The address arbitration funnel selects a single wavefront (in the case of a single-datum operation) or pair of related wavefronts (in the case of a two-datum operation) for execution. The input instruction memory stores an operand for an operation to be performed and an associated address in the output instruction memory. The operation unit performs the operation of the operand retrieved from the input instruction memory. The associated address in the output instruction memory stores an identification for a next CPE and an instruction memory address at the next CPE for the next operation in the process.

Conditional branching is programmed by associating an operation with multiple output instruction memory addresses. Each output instruction memory address identifies a different next instruction. Conditional branching is achieved by selecting one of the several output instruction memory addresses.

BRIEF DESCRIPTION OF THE SEVERAL VIEWS OF THE DRAWING

Reference will be made to the following drawings, which illustrate preferred embodiments of the invention as contemplated by the inventor(s).

DETAILED DESCRIPTION OF THE INVENTION

To better appreciate the novel and innovative aspects of the invention, the distributed concurrent model of computation is briefly introduced, and the concurrent architecture is presented that directly reflects the concurrent model of computation in the same sense that the sequential architecture directly reflects the sequential model of computation.

1 Theory of Operation: Abstract Model

Figure 1A:
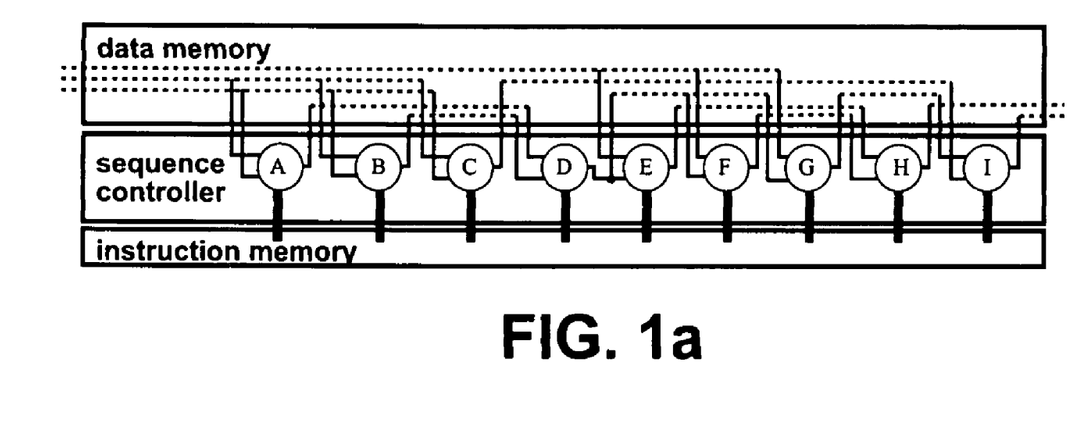
FIG. 1*a* illustrates a sequential model of a process.

A process can be viewed as a flow of data through operations that transforms the data. In the sequential model, the data is held in a memory, common to all operations, awaiting for an operation to fetch it. Each operation in sequence fetches its input from memory and stores its result back to memory. The data flows through memory and through each operation in turn. Data spends most of its life sitting in memory, and only one operation occurs at a time. This model, illustrated in FIG. 1a, extends process behavior through time one operation at a time.

Figure 1B:
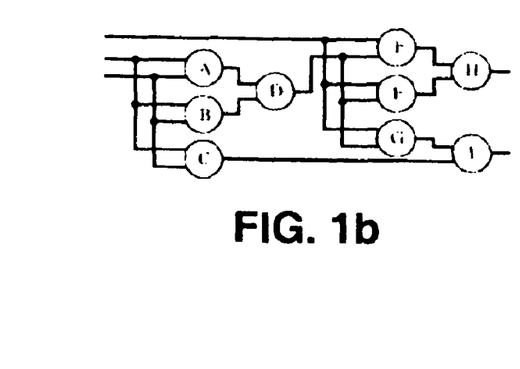
FIG. 1*b* illustrates a process expressed as a network of simultaneously instantiated operations.

The flow of data elements through operations can also be expressed as a network of simultaneously instantiated operations, illustrated in FIG. 1b, extending the expression through space rather than through time. The whole point of concurrent expression is to extend expression through space as a network of directly associated operations rather than to extend expression through time as a controlled sequence of operations. Data elements, instead of waiting in memory for their operations to get their turn in sequence, flow directly from operation to operation transforming as they flow. Instead of there being a single operation resource used over and over in sequence, in the concurrent model there are sufficient operation resources to populate the complete network of operations.

Consider that the data elements flow as discrete objects that inherently maintain their identity: they do not get mixed up. Consider further that each operation can recognize when new data elements are presented at its input, when its input is complete, when it is done processing the presented data elements and when it is ready to accept a new presentation of data elements at its input. Individual data elements autonomously and independently flow through autonomously and independently behaving operations. The network of components behaves autonomously. The individual components cooperatively coordinate their own behavior among themselves. Input data elements are presented at the input of the network and spontaneously flow through the network of operations emerging at the output of the network as resolution data elements. This behavior can be realized in practice with logically determined system design. See Karl M. Fant, *Logically Determined Design: Clockless System Design with NULL Convention Logic*, (Hoboken, N.J., Wiley Interscience, 2005).

In the concurrent model of computation there is no requirement for an overseeing controller or overarching synchronizer. Coordinated behaviors proceed in terms of autonomously cooperating behavior. This view of data spontaneously flowing through autonomously behaving operations is a very different view from the traditional sequential view of passive data elements and passive operations being explicitly controlled and synchronized by external expressions. But it is this distributed, spontaneously-flowing autonomy and the absence of explicit control and synchronization that enables genuine concurrent computing.

1.1 Concurrent Behavior

As data flows through a network of operations, concurrent operation behavior proliferates. There will be several operations at any instant that are presented with complete inputs and are resolving those inputs. The behavior of the network of operations naturally proliferates parallelism. As soon as an operation is done with one input data set and has passed on its result data element, it can accept a new input data set. The resolution of successive data sets pipeline through the network of operations. The network of operations and its behavior model naturally support the exploitation of all possible concurrent behavior, both parallel and pipelined.

The behavior model provides all the behaviors necessary to express complex systems. The operations provide data transformation. The operations fully coordinate flow behavior among themselves. The flowing data is maintained in the flow paths (memory). The autonomously behaving operations and the autonomously flowing data provides liveness of behavior.

1.2 Uncertainty and Deferment

The whole point of a process expression is to defer uncertainty of behavior in relation to certainty of behavior. In any process there is a part that is certain and that can be pre-expressed, and there is a part that is uncertain and that cannot be pre-expressed. The uncertain part is deferred in relation to the certain part that can be pre-expressed. The uncertainty is expressed as a deferment expression and is resolved with the presentation of a fulfillment expression that satisfies the deferments.

Each expression, the deferment expression and the fulfillment expression, is a partial expression insufficient to behave on its own. When a fulfillment expression is combined with a deferment expression, a complete expression is formed whose behavior is fully determined. The expression of deferment must be explicit in the deferment expression. When a fulfillment expression is presented to a deferment expression, the deferment expression must recognize the fulfillment and proceed accordingly. The deferment expression is called a process or a program. The fulfillment expression is called data or control.

1.2.1 Direct Mapping Operations

The simplest process expression is a simple mapping of presented input to asserted output. An example is a Boolean logic operation shown in FIG. 2 with its truth table and graphic icon 10. The mapping table is a deferment expression. The uncertainty is which output value to assert. This uncertainty is deferred to the presentation of two input values by specifying which output value to assert for each possible combination of input values. When input values are presented, they fulfill the deferments of the deferment expression. The fulfilled expression becomes complete and specifies a uniquely-determined output behavior. An output behavior might be quite different from the input behavior. Input values might translate to an output motion for example instead of an output value.

Figure 2:
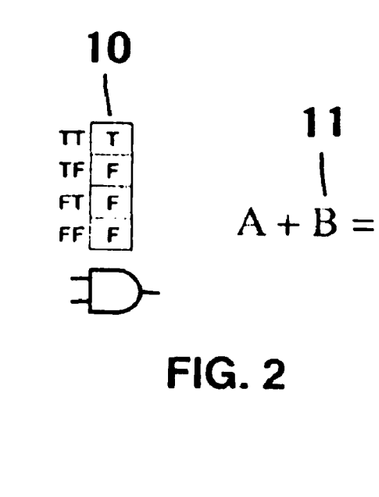
FIG. 2 illustrates a Boolean logic operation with truth table, graphic icon, and algebraic equation.

Another example at a higher level of abstraction is a simple algebraic equation 11 shown in FIG. 2. The algebraic equation is a deferment expression. The uncertainty is the value of C, which is deferred to the presentation and addition of two input values A and B. When input values (fulfillment expression) are presented, the expression becomes complete and behaves by asserting the appropriate output value for C.

1.2.2 Combined Mapping Operations

Direct mapping operations can be combined in a network of output-to-input relationships to express a larger range of uncertain output behaviors deferred to a larger range of input values. Each direct mapping operation cannot pre-express what values will be presented but, except for the input operators, it can pre-express where the values will come from by directly associating with the output of another direct mapping operation. A large uncertainty is deferred as a progression of smaller uncertainties forming a deferment expression of direct association relationships among the mapping operations.

Figure 3:
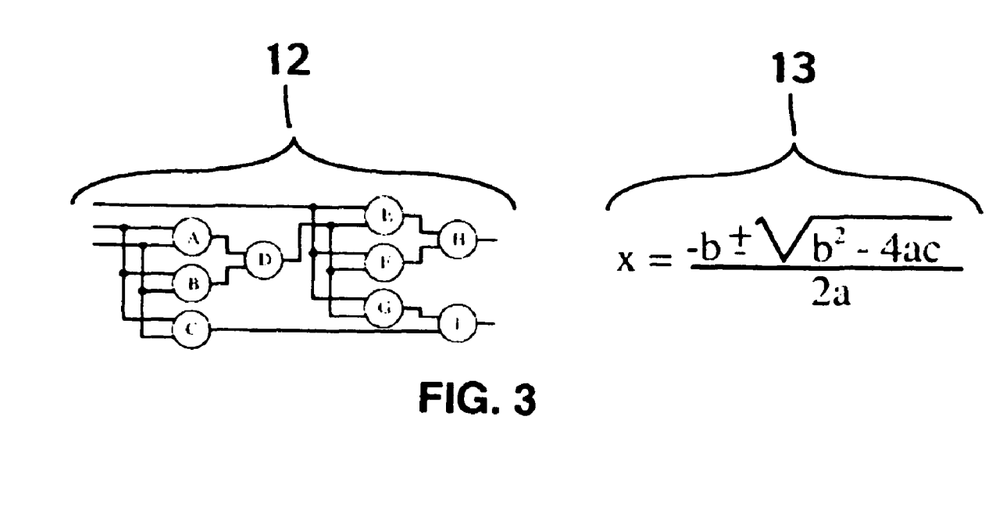
FIG. 3 illustrates association structures of direct mapping operations.

Association structures of direct mapping operations are shown in FIG. 3. A combination of mapping operations 12 defer the assertion of two output values through a structure of directly associated mapping operations to the presentation of three input values, which is more deferment than any single Boolean operation can express. The quadratic formula 13 defers two output values to a structure of association operations on three input values. Assume that A, B and C of equation 11 of FIG. 2 are 32 bit integers. The addition expression is an association structure of digit additions that defers 32 output digit values to the presentation of 64 input digit values.

1.2.2.1 The Structure of Fulfillment

A fulfillment expression is presented to the input operators and flows through the network of operations as a wavefront of progressive local fulfillments. The structure of the deferment expression is a static network of operations. A fulfillment expression initially presents values conforming to the structure of the inputs to the input operators of the deferment expression. As the fulfillment expression flows through the deferment expression it dynamically transforms both its content and structure in conformance to the local structure of the deferment expression.

1.2.3 Uncertainty of Direct Association

If a specific association relationship is uncertain and cannot be pre-expressed it must be deferred with a conditional association expression. The output of a particular operation might associate with three different possible inputs of mapping operations through a conditional fan-out association structure. Or the input of a particular mapping operation might associate with three possible outputs of mapping operations through a conditional fan-in association structure.

The deferment of association is expressed in two stages, and the fulfillment expression is structured in two parts. One part is the fulfillment for the condition, and the other part is the data part that is being conditionally steered. Together they fulfill a particular place of deferment in the deferment expression. The conditional part is transformed into a steering behavior in the deferment expression and disappears. The data path part continues to flow through the selected association path.

It is a compound deferment: a deferment of a deferment. Values are deferred to where they come from, and the "come from" is deferred to a condition. The expression of deferment can be compounded through arbitrary stages of indirection, but the chain of indirection must begin with a direct association. In this case, the deferment of the condition is a direct association, and the data path association is indirect through the conditional association structure.

Figure 4:
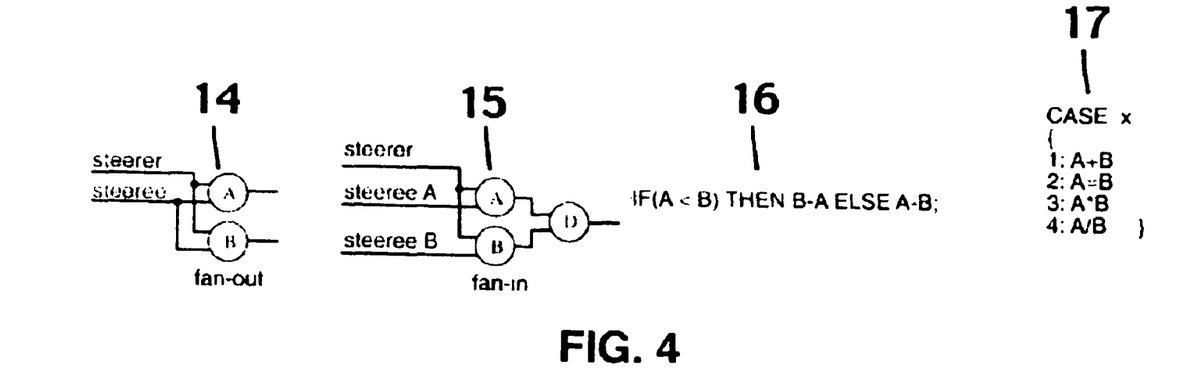
FIG. 4 illustrates deferred associations.

Deferred associations are shown in FIG. 4. The deferment might be in terms of an inherent property of the presented value, such as a magnitude compare 16, or one part of the deferred expression might determine the path of flow through the pre-expression for another part of the deferred expression, such as with a fan-out steering circuit 14, as with a fan-in steering circuit 15 or as with a CASE statement 17.

1.3 The Baseline Expression

As mentioned above the whole point of concurrent expression is to extend the expression through space rather than through time. The above expressions of deferment can compose a concurrent expression, which is an acyclic directed network of operations rendered completely in terms of direct association relationships among operators. A fulfillment expression composed of a combination of input values completely determines the behavior of the expression. No part of the expression is used more than once for each instance of fulfillment; there are no feedback paths. This static combinational expression, purely in terms of direct association relationships, forms a baseline of concurrent expression, illustrated in FIG. 5, to which all further expression relates

1.4 Uncertainty of Association Extension

The baseline expression extends through direct association relationships until there is uncertainty of association extension. This can arise with the expression of conditional convergence, such as with Euclid's greatest common divisor algorithm. An identical sub-expression is applied a number of times to a set of data wavefronts. The number of applications is conditional and cannot be pre-expressed, but the extension must occur during fulfillment. This is expressed by dynamically reapplying a single sub-expression the conditional number of times with an expression of conditional iteration. The conditional iteration expression feeds back on itself, sequentially reusing one sub-expression over and over, and extending association through time instead of through direct association space. The uncertainty of extension is deferred through the conditional iteration sub-expression which is integral to the baseline expression and which appears as a locality of sequentiality at the place of uncertainty in the baseline expression.

Figures 6A, 6B:
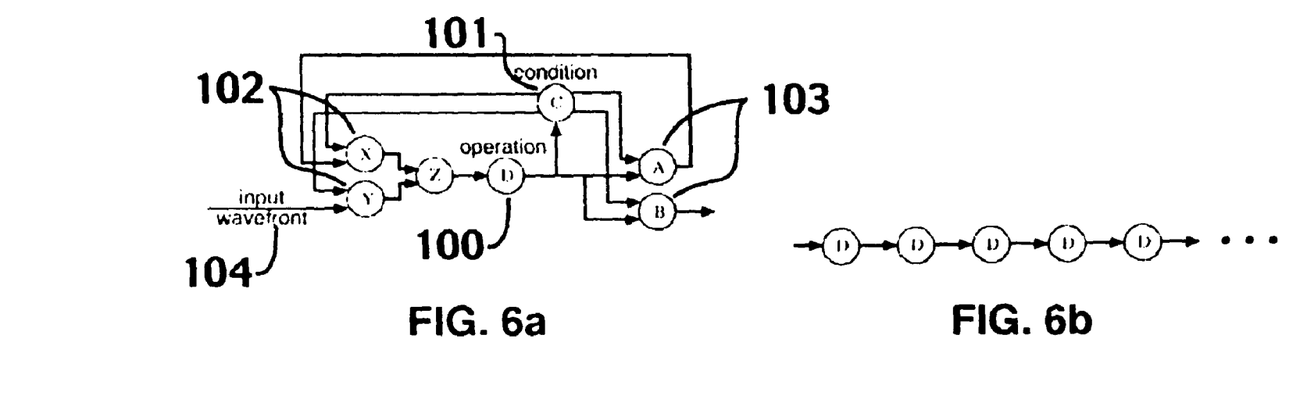
FIG. 6*a* illustrates a conditional iteration expression.
FIG. 6b illustrates a sequence of instances of an operation.

A conditional iteration expression is illustrated in FIG. 6a. The operation D 100 is the operation being conditionally extended. An input wavefront is presented 104 and allowed into the iteration structure. Operation D 100 is applied, and the condition is tested 101 for completeness. If the condition is not completed the wavefront is steered back into the structure through the output steering structure 103, is steered into the structure through input steering structure 102 and operation D 100 is applied again. If the condition is completed, the wavefront is steered out of the structure through the output steering structure 103, and the next input wavefront 104 is allowed through the input steering structure 102. The result is a sequence of instances of operation D illustrated in FIG. 6b inserted at a single place in the baseline expression. Uncertainty of network extension and the iteration structure manifest as a localities of sequentiality at the place of uncertainty in the baseline expression as illustrated by 22 in FIG. 7.

An input wavefront to the iteration structure is presented from the baseline expression. Fulfillment behavior extends through time by iterating until a condition is met, upon which a result wavefront is presented to the baseline and continues to flow through the association structure of the baseline expression. Iteration stalls the progression of wavefronts on the path containing the iteration structure.

1.5 Uncertainty of Wavefront Association

Uncertainty of wavefront association occurs at a place in the baseline expression where one of many possible wavefronts will be selected to continue flowing, and it cannot be pre-expressed which wavefront it will be. This can occur with sort and search, for instance, and random access data structures in general. The wavefronts in question cannot be distributed but must all be equally available at the specific place of uncertainty. Since any wavefront at the place might be associated, the set of wavefronts are an expression of non-locality in the expression. This non-locality of association is expressed with an addressable memory. In a memory, flowing wavefronts are stopped, maintained indefinitely and later allowed to continue flowing. If a memory is explicitly addressable, any wavefront flowing into the memory can be stored at any specified location, and a wavefront from any specified location can be selected to flow out of the memory. Uncertainty of wavefront association manifests as a locality of non-local association expressed as an addressable memory at the place of uncertainty in the baseline expression, as illustrated by memory 21 in FIG. 7.

The memory is just another place of direct association within the baseline expression. Fulfillment behavior flowing through the baseline expression flows to and through the memory. Deferred addresses are resolved in the flow prior to associating to the memory.

1.6 The Concurrent Expression

Figure 7:
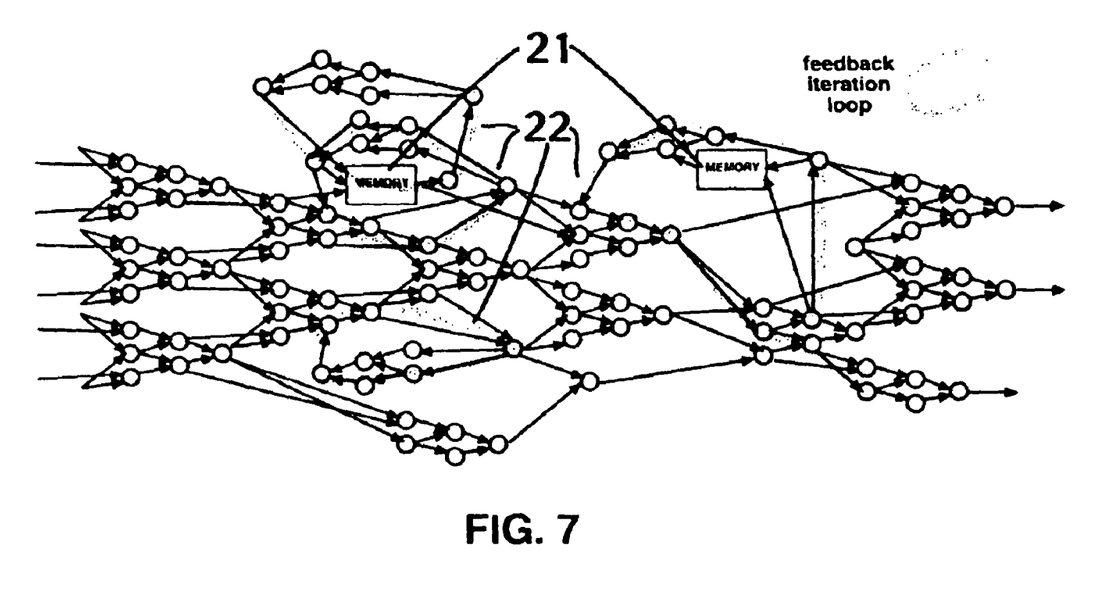
FIG. 7 illustrates localities of sequentiality at the place of uncertainty in a baseline expression.

A concurrent expression is a directed network of directly associated operations, illustrated in FIG. 7, expressing all possible concurrency. Localities of uncertain association are deferred through the expressions of iteration 22, and localities of uncertain, non-local wavefront association are deferred through expressions of addressable memory 21. A concurrent expression of directly associated operations is an expression of general locality with islands of sequentiality (iteration) and of non-locality (memory), which are concurrent among themselves within the baseline expression. It is a concurrent expression with instances of sequentiality rather than a sequential expression with instances of concurrency.

A concurrent expression is a concurrent program.

2 Theory of Operation: Concurrent Architecture

The purpose of a programmable architecture is to implement as closely as possible the behavior of an abstract model. What is needed to implement the concurrent expression model is autonomously behaving operation nodes, which can perform a set of generic operations, interconnected in a generic network of flow paths over which wavefronts of data can spontaneously flow. A concurrent program can then be realized by steering data wavefronts through the interconnection network from operation node to operation node and informing each operation node which operation to perform.

Spontaneously flowing wavefronts and autonomously behaving operation nodes can be realized with logically determined system design. Karl M. Fant, *Logically Determined Design: Clockess System Design with NULL Convention Logic*, (Hoboken, N.J., Wiley Interscience, 2005). Wavefronts spontaneously flow as coherent individual entities bounded and isolated from other data wavefronts expressing discrete token flow, which is directly appreciated by each operation. Each operation autonomously determines when a complete input is presented, autonomously receives and resolves the presented input, autonomously determines when it has completed the resolution, autonomously determines when it is ready to receive a next input to resolve, and autonomously coordinates this behavior with its directly connected neighbors.

The unitary coherence of the data wavefront flow in combination with the autonomous behavior of the operators that appreciate and maintain their coherent flow is sufficient to directly map a concurrent program and realize its expressed behavior. The concurrent architecture effectively implements the concurrent model of computation.

Figure 8:
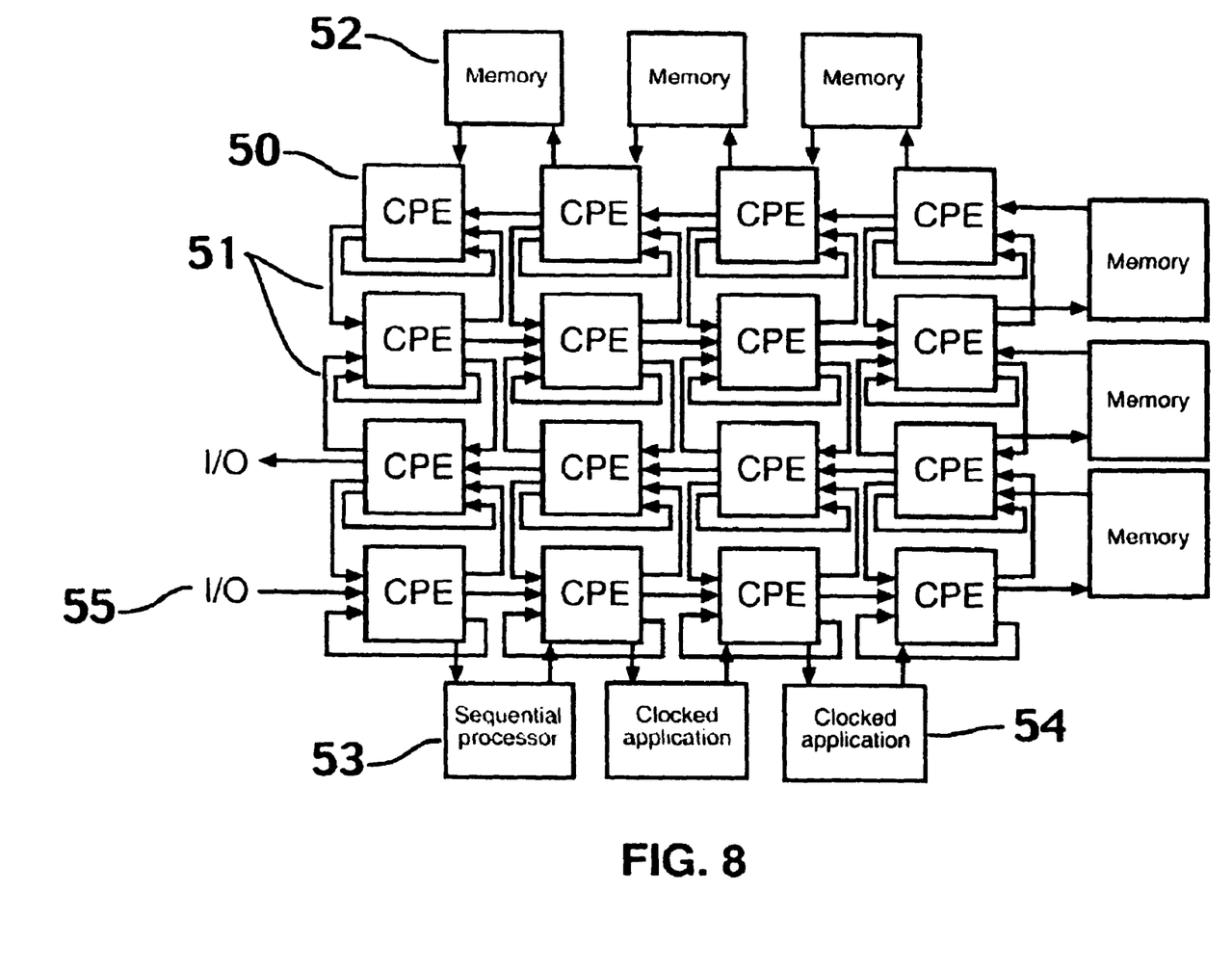
FIG. 8 illustrates a concurrent architecture of generic network of generic operation nodes.

A concurrent architecture, illustrated in FIG. 8, is a generic network of generic operation nodes. Each generic operation node is an autonomously behaving concurrent processing element (CPE) 50 that can perform a set of basic operations such as arithmetic and logic. The CPEs are connected in a directed cyclic network of data flow paths 51 such that each row flows in opposite directions and each column can flow either up or down. This allows complex cyclic flow patterns to be mapped into the network of CPEs. Other topologies may be used. There may also be other forms of processing elements such as memories 52, sequential processors 53, clocked hardware circuits 54, and I/O channels 55 connected into the network of flow paths.

A concurrent program is mapped into the concurrent architecture by mapping successive operations of the concurrent program into neighboring CPEs such that each successive operation/instruction is in a next CPE. The data elements that flow from operation node to operation node in the concurrent program now spontaneously flow through the CPE network from CPE to CPE.

2.1 The Concurrent Processing Element (CPE)

Figure 9:
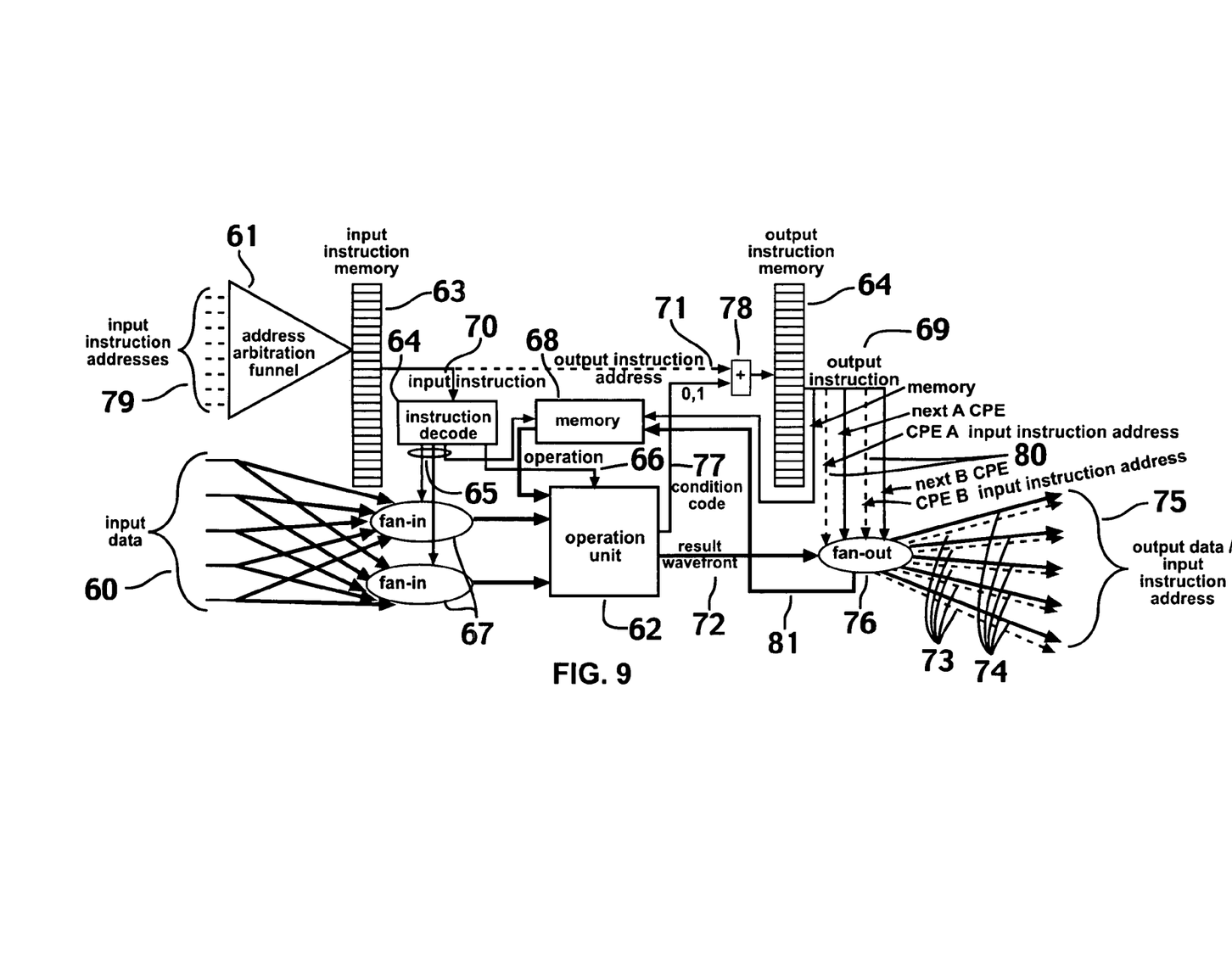
FIG. 9 illustrates a concurrent processing element.

The concurrent processing element (CPE), the generic operation node of the above discussion, is illustrated in FIG. 9. It can perform several operations, can receive input over several input paths from neighboring CPEs or other processing elements and send result output over several output paths to neighboring CPEs or other processing elements.

A CPE performs one operation of a program and passes data on to a next CPE which performs a next operation and passes data onto a further next CPE which performs a next operation and so on. As program behavior flows from CPE to CPE the resolution of the program proceeds operation by operation.

2.1.1 The CPE Instruction

Figure 10:
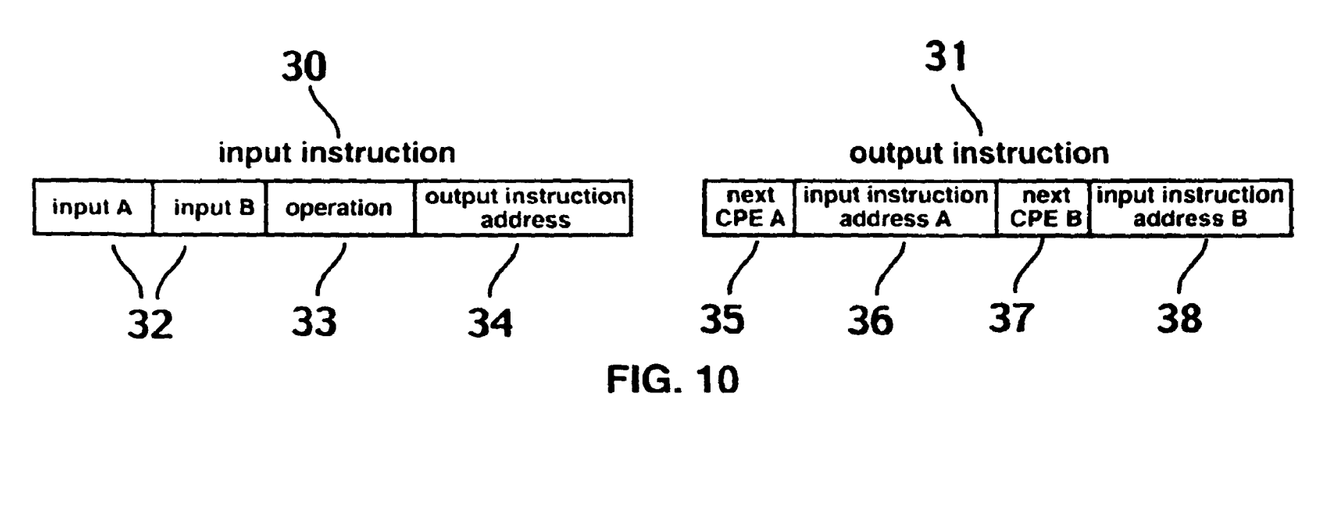
FIG. 10 illustrates a concurrent processing element instruction.

The CPE instruction, illustrated in FIG. 10, is split into two internal instructions, an input instruction 30 and an output instruction 31, which allows convenient pipelining behavior through the CPE. The input instruction 30 enables the input wavefronts 32, instructs the operation unit with an operation code wavefront 33 and generates the output instruction address wavefront 34. When a result wavefront emerges from the operation unit 62, the output instruction 31 enables the output paths directing the result data wavefront to one or two next CPEs 35, 37 along with a corresponding input instruction address for each CPE 36, 38.

2.1.2 Input to the CPE

A CPE receives input wavefronts consisting of one or two input operands and an input instruction address. As illustrated in FIG. 7, each CPE connects to a number of other CPEs through a unique connection pathway. A wavefront may arrive at the receiving CPE on a unique port corresponding to each connection pathway, as discussed in more detail below. The operand wavefronts are presented to the data input paths 60, and the input instruction address is presented to the arbiter funnel 61 on the instruction input path 79. The CPE can accept one operation at a time to perform, so the input boundary to the CPE is strictly sequential. Since input wavefronts can arrive at any time and in any order, their presentation to the CPE is not coordinated. The job of the arbiter funnel 61 is to coordinate the wavefront flow by allowing only one input operation at a time into the CPE.

Each input instruction address wavefront generates a request to the arbiter funnel 61 to enter the CPE. The arbiter funnel arbitrates the requests and grants one request at a time. When a request is granted the input instruction address is presented to the input instruction memory 64 and an input instruction is read out. The input instruction is decoded 64. Input data path enables 65 are presented to the input fan-in steering elements 67 presenting input data wavefronts to the operation unit 62. The operation code 66 is presented to the operation unit 62. One of the inputs to the operation unit 62 might come from the memory 68.

2.1.2.2 Coordination of Input

A typical operation in the CPE will require two input wavefronts. These wavefronts will come from two different source CPEs and will arrive at the input of the current CPE in any order with an arbitrary interval between arrivals. The flow of the two arriving wavefronts is not coordinated, and they must be coordinated at the input of the CPE. Since both wavefronts are to be processed by the same operation they will both be accompanied by the same input instruction address. This commonality of input instruction address provides the mechanism of coordination. The addressed input instruction will not be dispatched until both wavefronts have arrived, that is, until its input is complete. To facilitate this, the input instruction will require that it be addressed twice before dispatching itself, thus enabling the input wavefronts to the operation unit and instantiating its operation.

2.1.2.3 Single Operand Input

The simplest flow through a CPE is a single operand operation. A single wavefront arrives with its input instruction address. The input instruction address 79 is presented to the arbiter funnel 61. When the address is granted its turn, it reads the input instruction, which enables the single input operand, instantiates it's operation in the operation unit, and dispatches the output instruction address 71.

2.1.3 The Operation Unit

The operation unit 62 can perform a set of arithmetic-logic operations specified by an operation code 66. It is a stateless operator. Successive operations entering a CPE are independent in relation to that CPE. Consequently the CPE can accept and execute operations indiscriminately without concern for any dependency problems. This allows a CPE to be a very simple pipeline processor. Many operations can be flowing through the CPE one behind the other with no conflict, which eliminates the need for conflict circuitry and for flushing the pipeline.

The split instruction conveniently supports pipelining with fine granularity in the operation unit 62 so that many independent operations can flow through it one behind the other. As a data wavefront pipelines through the operation unit 62, the corresponding output instruction address wavefront 71 pipelines along with it. The two wavefronts are coordinated at the output of the operation unit 62 by "Nthness." For every Nth operation 66 presented to the operation unit, there is an Nth output instruction address wavefront 71, so every Nth result data wavefront 72 will correspond to the Nth output instruction address wavefront 71. The output instruction address 71 will read an output instruction 69 from the output instruction memory 64 that will guide the result data wavefront 72 on its way.

2.1.4 Output from the CPE

The output instruction 69 enables one or two fan-out paths 76 and sends one or two input instruction addresses 80 directing each result wavefront 72 to one or two CPEs 74 along with an input instruction address 73 for each CPE. Each result wavefront then becomes an input wavefront 60, 79 for each destination CPE and will be arbitrated into that CPE through its arbitration funnel 61. The result wavefront 72 can also be sent to the internal memory 81.

The output of the CPE expresses fan-out. The fan-out originates from a single source and the replicated wavefronts proceed on their way independently so there is no coordination issue with the fan-out behavior.

2.1.5 Conditional Output Flow Branching

The CPE implements conditional behavior by altering the output instruction address 71. The operation unit 71 produces a condition code 77 with the values 0 or 1 along with its result wavefront 72. This condition code is added to 78 the output instruction address 71 as it is presented to the output instruction memory 64. Either the addressed instruction or the one following it is read out. Each instruction can specify different CPE destinations and different input instruction addresses. In this manner conditional branching is expressed as the program flows from CPE to CPE.

2.2 Program Methodology

Figure 5:
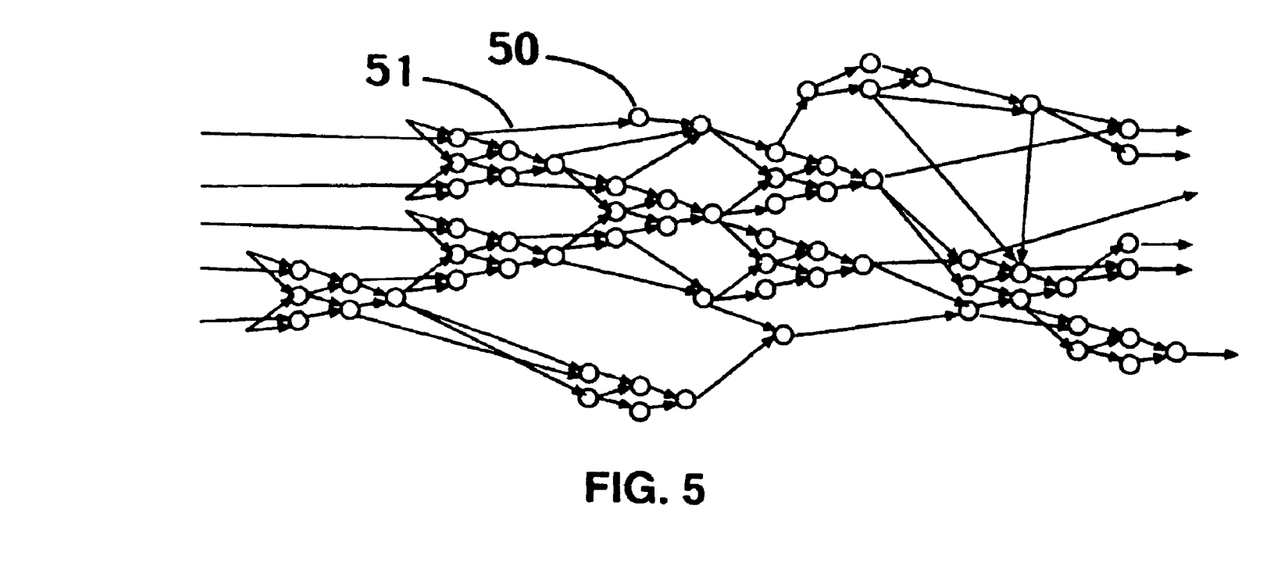
FIG. 5 illustrates direct association relationships.

A concurrent program, as illustrated in FIG. 5, is the source program for a concurrent architecture. Each node 50 represents an operation, and each arc between the nodes 51 represent the flow of data elements from operation to operation. This concurrent program can be compiled into a network of operations at a level of operation corresponding to the operations of a CPE. This is the assembly level program. This assembly program can then be generated as a linked list of machine operations each of which specifies (i) from which instruction to receive the input data, (ii) which operation to perform and (iii) to which instruction to send the output data. This linked list of operations is the relocatable program that can be directly mapped into the network of CPEs, one operation per CPE, such that the program flows from CPE to CPE through the network of CPEs.

2.2.1 Mapping the Program

Begin with a last instruction in the linked list. Map the last instruction into an available instruction memory location of a first CPE. The instruction is split into an input instruction and an output instruction and mapped into the appropriate instruction memories. Map the directly previous instructions to second and third CPEs that are available predecessor neighbors to the first CPE and into available instruction memory locations in each CPE. Place the path to the first CPE and the input instruction location of the first CPE into the output instructions of the second and third CPEs. Continue this mapping until the entire program is mapped into the network of CPEs.

Figure 11:
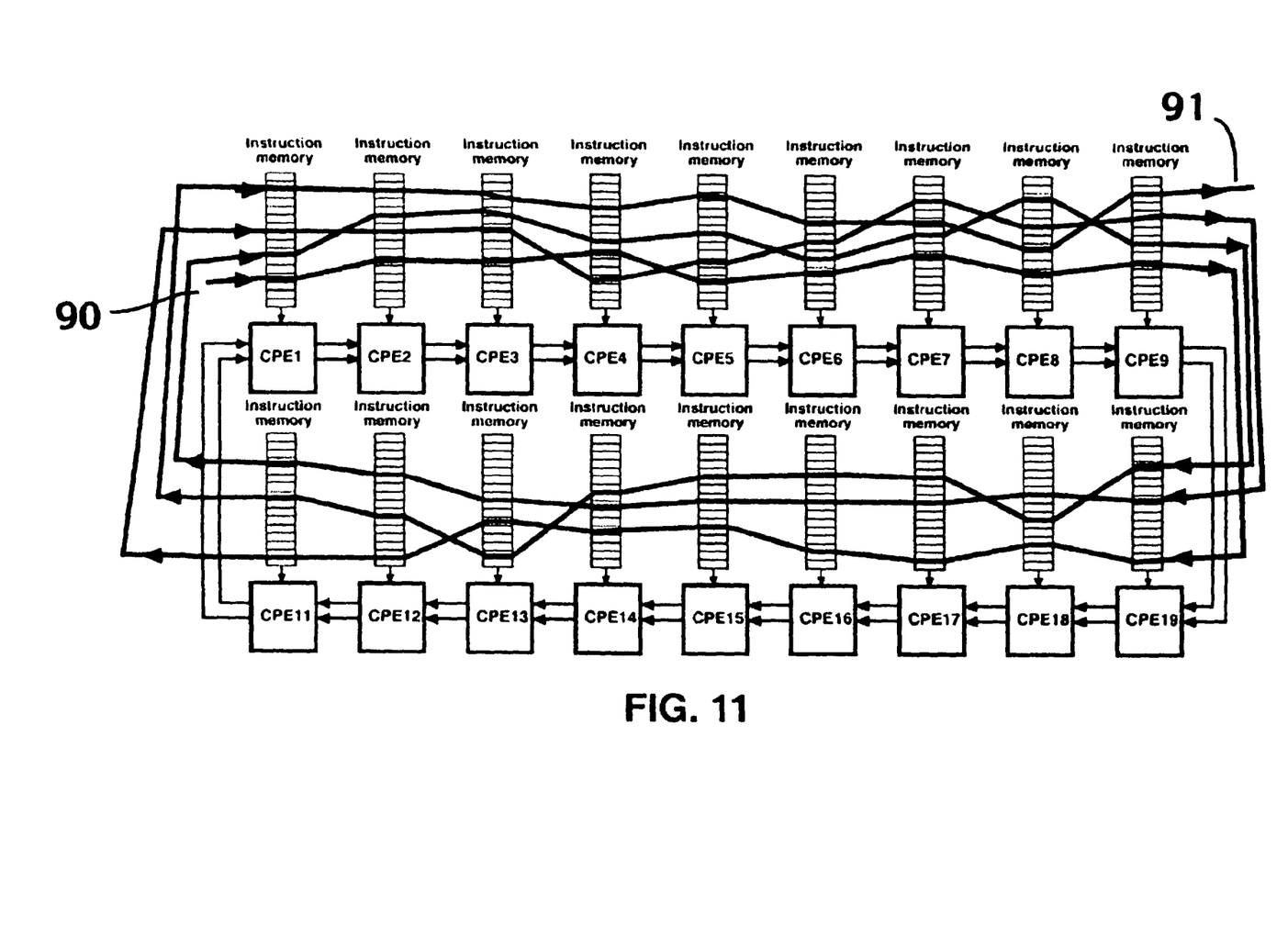
FIG. 11 illustrates a program thread reflecting back and forth through two rows of CPEs.

When the mapping encounters a boundary of the network, the mapping simply reflects back through the CPEs but through different instruction locations in each CPE. FIG. 11 illustrates a program thread reflecting back and forth through two rows of CPEs flowing in opposite directions. A long program thread enters at 90, continues back and forth through the network of CPEs and exits at 91. In this manner, any concurrent program can be mapped into any size network of CPEs. If there is a single CPE the program just keeps reflecting back through the single CPE building through its instruction memory addresses. It becomes an analogue of a sequential processor.

Figure 12:
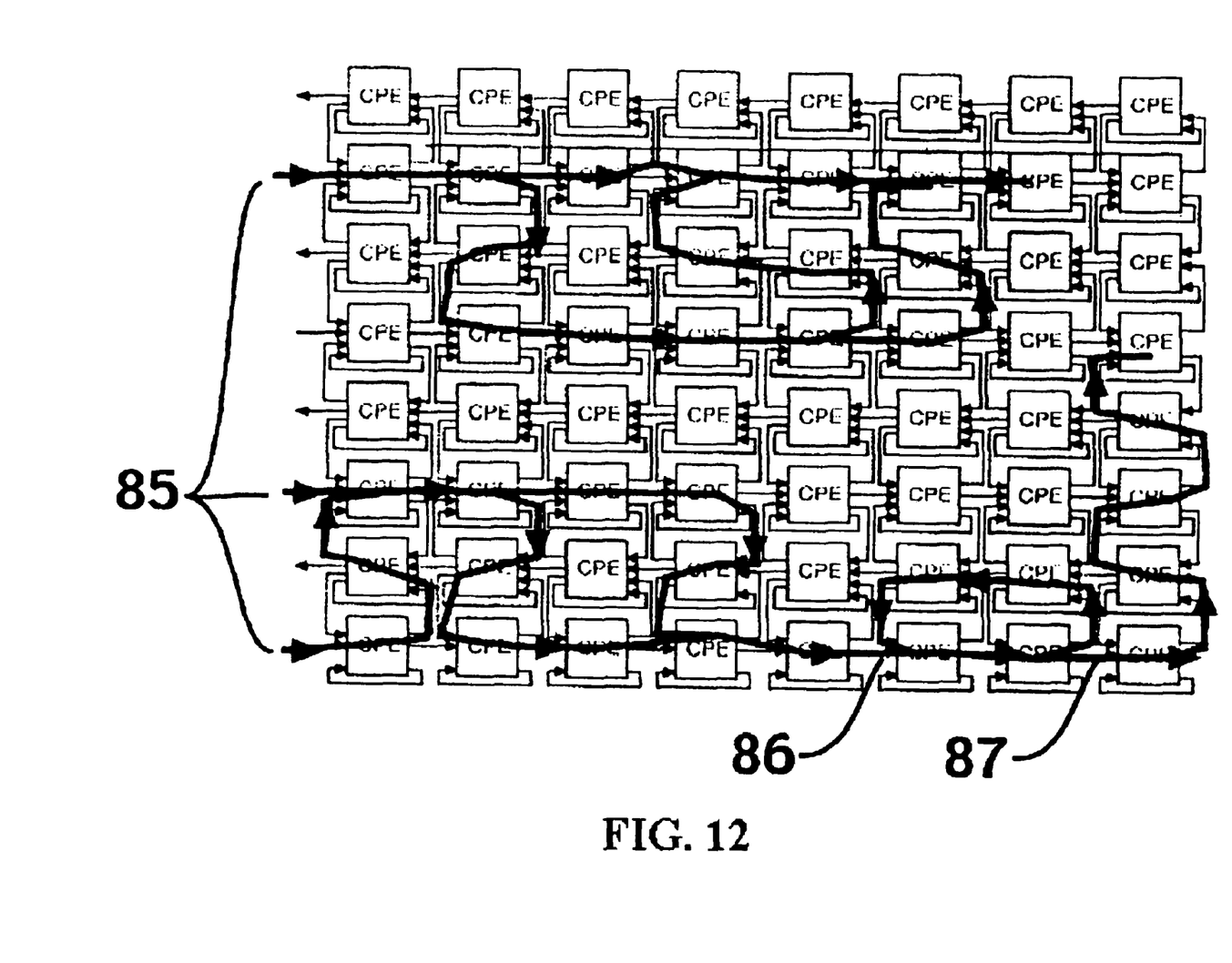
FIG. 12 shows operation flows mapped into a network of CPEs.

FIG. 12 shows operation flows beginning at 85 mapped into a network of CPEs. The flow paths progress through the network of CPEs forking and merging as they flow. The flow at the lower right includes an iteration loop. The iteration loop is entered at 86 and is exited at 87.

If a memory is specified in the concurrent program then the mapping is oriented around the memory such that when a memory access is required the program flows to the memory with the appropriate fulfillment wavefronts. A memory is just another node in the network that a program flows to and through as needed.

2.2.2 Loading the Program

Several utility programs will be hardwired into the program memories and may include instruction not available for general programming. One utility program will be the bootstrap loading program. Once a program has been mapped to CPEs and instruction addresses the program will be entered through an I/O port at one CPE one instruction set at a time. Each instruction set will be a packet containing the location of the CPE relative to the entry CPE, the two instructions and the two instruction addresses. The array of CPEs is essentially a packet switching network. The packet will flow through the network of CPEs to the target CPE whereupon the target CPE will load the instructions in the specified addresses. Each CPE will return an acknowledge indicating that the instruction is loaded.

Program loading proceeds one instruction set at a time just like a program is loaded in a sequential machine and should occur as rapidly. Once the program is loaded the program can proceed with full concurrency of behavior.

2.2.3 Efficiency of Mapping

A program will map from CPE to CPE through the instruction memories of the CPEs. There is a great deal of flexibility in the mapping. There can be several next CPEs to choose from when mapping the next instruction. The instruction can be mapped into any instruction address in a CPE. A program spreads through CPEs one instruction at a time distributing the instructions uniformly over the CPEs. It will not be the case that one CPE can fill up with instructions and block mapping to other CPEs that have available instruction addresses.

Just as a common memory provides the general and scalable mapping fabric for sequential programming, the network of CPEs and their instruction memories provides the general and scalable mapping fabric for concurrent programming.

2.3 Scalability

A concurrent program will scale to any size network of CPEs. If the network is large, lots of concurrent behavior will be exploited. If the network is small the there will be relatively little concurrency. As technology scales to allow more and more CPEs on a chip, the concurrent programs will scale with the technology. An assembly level program or a linked list machine code program will map into any size network of CPEs that support the instruction set of the programs. If the instruction set changes, then the source concurrent program is recompiled to the new instruction set.

A concurrent program expresses all the possible concurrency of the process and will compile into any future concurrent processor. Program once—map forever.

2.4 Concurrent Behavior

The concurrent architecture supports both parallel and pipeline concurrent behavior expressed in the concurrent program. If one rides a data wavefront, one sees the state of a single program changing as the wavefront flows from PE to PE. If one sits on a PE, one sees a stream of independent instructions flow through the PE. These independent instructions can belong to a multitude of independent programs or to independent paths of a single program.

Input instructions compete for a CPE instruction by instruction. Upon completion, they flow to a next CPE and compete again. Dependent instruction flows within a single program are coordinated by completeness relationships. Independent instruction flows do not need to be coordinated. Instruction flows of separate programs and concurrent flows of a single program will flow through the network of CPEs interleaving at the instruction level without interfering.

As successive instances of input for a single program pipeline into the architecture, as the parallelism inherent in a program proliferates, and as independent programs flow through the architecture, both parallel and pipeline concurrent behavior proliferates, spreading uniformly through the network of CPEs.

2.5 Flow through Peripheral Processing Elements

A peripheral processing element is treated just like a CPE with input and output instructions. It just has a different internal expression. Instead of the operation unit being an ALU, it might be a special purpose circuit, a memory, a clocked sequential processor, an I/O port and so on.

3 Genuinely Distributed Concurrent Computing

The concurrent architecture directly implements the abstract model of concurrent computing delivering conveniently programmable distributed concurrent computing. The concurrent computing model, grounded in logically determined design principles, is concurrent at its foundations in contrast to centralized and sequential at its foundations. Data spontaneously flows through a network of directly connected operations. The flow of data is fully coordinated and fully logically determined by autonomously behaving, and mutually cooperating operations. There is no centralized controller, no global synchronizer and no common memory.

A concurrent program is an expression of distributed concurrent behavior, which can have localities of sequential iteration and of addressable memory within it, but these localities are distributed and concurrent among themselves within the concurrent expression. It is a distributed concurrent expression with instances of centralized sequential behavior in contrast to a centralized sequential expression with instances of distributed concurrent behavior.

The concurrent architecture implements this model of computation with a generic directed network of generic concurrent processing elements, CPEs. Heterogeneous peripheral elements such as clocked processing units and I/O channels can be directly integrated into a network. A concurrent program can be mapped directly into the concurrent architecture and the architecture realizes the expressed concurrent behavior both parallel and pipelined to the extent of its resources.

The architecture is easily programmable and inherently scalable in that concurrent program can be easily mapped into any size network of CPEs. Larger networks of CPEs will exploit more concurrent behavior from individual programs and multiple independent programs than will smaller networks. A concurrent program once written will map to any future concurrent architecture of any size.

The embodiments described above are intended to be illustrative but not limiting. Various modifications may be made without departing from the scope of the invention. The breadth and scope of the invention should not be limited by the description above, but should be defined only in accordance with the following claims and their equivalents.

What is claim is:

1. An electronic processing element for use in a system having a plurality of processing elements, a first processing element of the plurality of processing elements comprising:
    (a) an input instruction memory configured to store and output a plurality of operation codes and, for each operation code, store and output an associated output instruction memory address;
    (b) an operation unit configured to generate an output datum defined by at least a selected operation code and an associated input datum; and
    (c) an output instruction memory configured to receive the output instruction memory address and to output an address for an input instruction memory of a second processing element;
    whereby, upon receipt of an input instruction memory address and of an associated input datum, the processing element generates an output datum in association with a corresponding input instruction memory address of the second processing element.

2. The processing element of claim 1 wherein the operation unit is configured to generate an output datum defined by at least a selected operation code and two corresponding input datums.

3. The processing element of claim 1 further including a fan-in element coupled to the operation unit and configured to pass an input datum selected from one of a plurality of data sources.

4. The processing element of claim 1 further including a fan-in element coupled to the operation unit and configured
   (a) to pass a first input datum selected from one of a plurality of data sources, and
   (b) to pass a second input datum selected from one of a plurality of data sources, said second input datum associated with said first input datum.

5. The processing element of claim 1 further including an address arbitration funnel coupled to the input instruction memory and configured to selectively pass a one of a plurality of input instruction memory addresses.

6. The processing element of claim 1 wherein the operation unit is further configured to generate a condition code in response to an operation code and at least one input datum.

7. The processing element of claim 6 wherein the output instruction memory is further configured to retrieve an address for an input instruction memory of a second processing element dependent upon (a) an output instruction memory address retrieved from the input instruction memory, and (b) a condition code generated by the operation unit.

8. The processing element of claim 1 wherein an address for an input instruction memory of the second processing element includes (a) an identification of the second processing element, and (b) an identification of a memory address associated with the second processing element.

9. The processing element of claim 1 wherein the output instruction memory is further configured to retrieve an address for an input instruction memory of a third processing element.

10. The processing element of claim 9 further including a fan-out element configured
    (a) to output an output datum to a second processing element in association with an address for an input instruction memory of the second processing element, and
    (b) to output the output datum to a third processing element in association with an address for an input instruction memory of the third processing element.

11. A method using a plurality of electronic processing elements to perform a process expressed as a set of predetermined instructions, said method comprising:
    (a) providing a plurality of processing units, each processing unit including
        (i) an operation unit configured to generate an output datum in response to at least one input datum and an operation code, and
        (ii) an instruction memory configured to store and output instructions, said instruction memory including
            (A) an input instruction memory configured to store and output an operation code and a memory address for an output instruction memory, and
            (B) an output instruction memory configured to store and output at least one memory address for a subsequent instruction of the process;
    (b) storing instructions in instruction memories such that
        (i) an instruction memory associated with a first processing element stores a first instruction that produces a datum,
        (ii) an instruction memory associated with a second processing element stores a second instruction that operates on the datum, and
        (iii) the first instruction includes an address for the second instruction; and
    (c) performing the process by
        (i) associating data with input memory instruction addresses for instructions to process the data, and
        (ii) communicating associated data and input memory instruction addresses together among processing elements.

12. The method of claim 11 wherein the step of providing a plurality of processing elements provides a processing element that includes:
    (a) an operation unit configured to generate an output datum in response to at least two input datums, and
    (b) an input instruction memory that retrieves an operation code when the processing element receives two datums associated with a single input instruction memory address.

13. The method of claim 11 wherein the step of providing a plurality of processing elements provides a processing element that has an arbitration funnel coupled to an instruction memory and configured to selectively pass one of a plurality of input instruction memory addresses.

14. The method of claim 11 wherein:
    (a) the process is expressed with a conditional instruction that, depending on a condition, is followed by one of at least two possible instructions; and
    (b) the step of performing the process associates a datum with an instruction memory addresses for one of the at least two possible instructions selected according to the condition.

15. The method of claim 14 wherein the step of providing a plurality of processing elements provides:
    (a) an operation unit configured to generate a condition code depending upon the condition; and
    (b) an instruction memory including an output instruction memory configured
        (i) to store input memory instruction addresses for the at least two possible instructions and
        (ii) selectively to retrieve one of the input instruction memory addresses according to the condition code.

16. The method of claim 14 wherein, for the conditional instruction, the step of storing instructions in instruction memories stores (a) an address for a first of the at least two next instructions and (b) an address for a second of the at least two next instructions.

17. The method of claim 11 wherein
    (a) the process is expressed with an instruction that generates a datum used by at least two subsequent instructions, and
    (b) the step of providing a plurality of processing elements provides an output instruction memory configured to retrieve input instruction memory addresses for the at least two subsequent instructions upon generation of the datum.

18. The method of claim 11 wherein:
    (a) the process is expressed with an instruction that generates a datum used by at least two subsequent instructions, and
    (b) the step of performing the process associates the datum with input memory instruction addresses for the at least two subsequent instructions.

19. An electronic method using a plurality of processing elements to perform at least two processes concurrently, said first process expressed as a first set of predetermined instructions and said second process expressed as a second set of predetermined instructions, said method comprising:
(a) providing a plurality of processing units, each processing unit including
   (i) an operation unit configured to generate an output datum in response to at least one input datum and an operation code, and
   (ii) an instruction memory configured to store and output instructions, said instruction memory including
      (A) an input instruction memory configured to store and output an operation code and a memory address for an output instruction memory, and
      (B) an output instruction memory configured to store and output at least one memory address for a subsequent instruction of a process;
(b) storing the first set of instructions in instruction memories such that
   (i) an instruction memory associated with a first processing element stores a first instruction of the first set of instructions that produces a first datum,
   (ii) an instruction memory associated with a second processing element stores a second instruction of the first set of instructions to process the first datum, and
   (iii) the first instruction of the first set of instructions includes an address for the second instruction of the first set;
(c) storing the second set of instructions in instruction memories such that
   (i) an instruction memory associated with a first processing element stores a first instruction of the second set of instructions that produces a second datum,
   (ii) an instruction memory associated with a third processing element stores a second instruction of the second set of instructions to process the second datum, and
   (iii) the first instruction of the second set of instructions includes an address for the second instruction of the second set; and
(d) performing the processes concurrently by, for both process
   (i) associating data with input memory instruction addresses for instructions operating on the data, and
   (ii) communicating associated data and input memory instruction addresses together among processing elements.

20. The method of claim 19 wherein the third processing element is the second processing element.

* * * * *